Nov. 19, 1946.                W. R. HARDING                2,411,371
                              CONTROL SYSTEM
                            Filed June 14, 1944
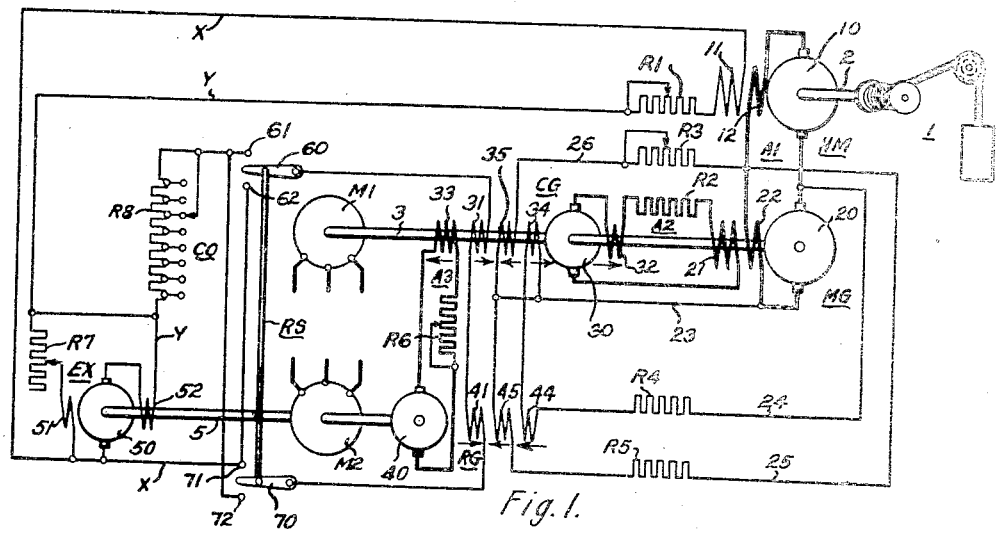

Patented Nov. 19, 1946

2,411,371

UNITED STATES PATENT OFFICE 2,411,371

CONTROL SYSTEM

William R. Harding, Export, Pa., assignor to Westinghouse Electric Corporation, East Pittsburgh, Pa., a corporation of Pennsylvania Application June 14, 1944, Serial No. 540,247

11 Claims. (Cl. 172—239)

My invention relates to control systems of the variable voltage type and particularly to systems containing an auxiliary regulating generator for limiting the load current of a motor to be controlled, systems and generators of this kind being disclosed in the copending applications, Serial No. 496,596, filed July 29, 1943, and Serial No. 532,975, filed April 27, 1944, both by J. G. Ivy, and both assigned to the assignee of the present application.

An object of my invention is to provide a control system of the type just referred to that produces not only a load limiting regulating effect, but is also distinguished by an increased accuracy and speed as regards its response to changes of control adjustment, while being substantially free of hunting even at a high rate of change at the control adjustments.

Another object of my invention, with reference to hoists and particularly mine hoists, is to provide a hoist control system in which the torque of the hoist motor and hence the stress on the ropes and other mechanical hoisting equipment are automatically limited due to control characteristics inherent in the electrical control system, and in which the hoisting speed is a function of the selected controller position regardless of the amount of load, thus reducing the degree of attention and skill for operating the hoist, for instance, when landing a cage or pulling a skip into the dumping horns.

In order to achieve these objects, and in accordance with the invention, I connect the main generator of a variable voltage control system with two cooperating auxiliary generators for controlling the field excitation of the main generator. One of these auxiliary generators, hereinafter called the "control generator," has a "self-excited" field winding rated for just sustaining the armature voltage, another field winding for current limiting purposes, and further field exciting means for a purpose mentioned hereafter. The other auxiliary generator, hereinafter called the "regulating generator," has a saturation characteristic so that it generates an armature voltage substantially only when its field excitation exceeds a given finite magnitude. The regulating generator has its armature connected to the current limiting field winding of the control generator and has field means excited in dependence upon the current in the load circuit of the main generator. In conjunction with the organization just referred to, it is an essential feature of the invention that both the control generator and the regulating generator have their field means connected with an operator controlled circuit for providing a selectively adjustable pattern voltage and also with circuit means that provide a control voltage variable in accordance with the voltage of the main generator load. The connection is so designed as to produce in both auxiliary generators a component field excitation in dependence upon the differential value of the just-mentioned pattern and control voltages. When referring above and hereinafter to "self-excited" field windings, I use this expression for designating a field winding that is shunt or series connected to the appertaining generator armature and hence, in contrast to a "separately excited" field winding, derives its excitation from the voltage or current generated by the armature of the same machine.

The above-mentioned and other objects and features of my invention, as well as a specific example of a control system embodying them, will be apparent from the following description of the mine hoist control system shown diagrammatically in Fig. 1 of the drawing, and elucidated by the explanatory diagrams of Figs. 2 and 3 and the detail showing in Fig. 4 of the pole structure of an appertaining regulating generator.

Referring to the hoist control system shown in Fig. 1, the hoisting equipment proper is schematically indicated at 1 and includes a hoisting drum whose shaft 2 is mechanically connected to the armature 10 of a driving motor HM. The motor has a separately excited field winding 11 and a compensating series field winding 12. The field winding 11 is energized from a current source of substantially constant voltage, and to this end is connected to the output mains X and Y of an exciter generator denoted by EX. The connection includes a rheostat R1 whose adjustment need not be varied during the operation of the control system. The exciter EX is self-excited by two field windings 51 and 52. Winding 51 is shunt-connected with the exciter output circuit through a rheostat R7 serving to adjust the exciter voltage to a proper magnitude. A single exciter field winding or a different arrangement and connection of the exciter field windings may be chosen without affecting the essential operation of the system, since the only purpose of the exciter EX is to represent a convenient direct-current source of sufficiently constant voltage.

The armature 10 of the hoist motor HM is connected in load circuit A1 with the armature 20 of a main generator MG which forms the current source of circuit A1. The main generator MG has a main field winding 21 connected in a control circuit A2 whose current source is formed by the armature 30 of a control generator CG. A resistor R2 is series-arranged in circuit A2. Numeral 22 denotes a compensating or interpole winding of the main generator MG.

The control generator CG has five field windings, numbered 31 through 35, all cooperating in controlling the voltage impressed on the main generator field winding 21. The resultant energization of field winding 21 determines the voltage and current supplied by the main generator armature 20 through circuit A1 to the hoist motor HM, thereby controlling the torque and speed of the hoisting equipment driven by the motor HM.

The current in circuit A2 is principally determined by the excitation of field winding 31, hereinafter called the "pattern field winding" of the control generator CG. Field winding 32 is self-energized and serves to amplify the control effect. While the connection of winding 32 in circuit A2 is shown as a series arrangement, a shunt winding may be used instead. Considering the excitation of pattern field winding 31 as a standard and assuming that main generator MG supplies energy to the hoist motor rather than functioning in a regenerative sense, windings 32 and 34 act cumulatively; that is, their ampere turns are in a proper direction to assist the ampere turns of pattern field winding 31. In contrast thereto, the field winding 35 acts differentially with regard to winding 31. For certain values of current in circuit A1, as will be explained later, field winding 33 is substantially deenergized. When energized by the action of a regulating generator RG, the effect of its ampere turns will subtract from that of the ampere turns of winding 35.

Field winding 34 of control generator CG is energized in dependence upon the voltage in load circuit A1, and to this end connected by leads 23 and 24 across the armature 20 of the main generator MG. Field winding 35 of control generator CG serves to compensate for the IR drop in the armature circuit of the main generator and is connected across winding 22 through leads 23 and 26 and in series with a calibrating resistor R3.

The pattern field winding 31, serving to determine the basic speed of the hoist motor as to direction and magnitude, is energized from a current source of constant voltage under control by operator-actuated voltage regulating and reversing means. More in detail, pattern winding 31 is connected to mains X and Y of the exciter EX, a reversing switch RS being interposed in order to select the polarity of the pattern voltage impressed on field winding 31. The connection includes a control device CO which has a resistor R8 connected between main Y and reversing switch RS.

The reversing switch RS, as illustrated, has two movable contacts 60 and 70, each cooperating with two stationary contacts 61, 62, and 71, 72, respectively. In one position of switch RS, contact 60 is in engagement with contact 61, and contact 70 with contact 71, in order to energize the hoist motor HM for operation in the hoisting direction. In its other position, the reversing switch RS connects movable contacts 60 and 70 with stationary contacts 62 and 72, respectively, for controlling the hoist motor so as to operate in the lowering direction. The control device CO is preferably designed in the form of a customary master controller, while the reversing switch RS and its contacts are preferably embodied by electromagnetic contactors which are controlled in accordance with the selected hoisting or lowering position of the master controller. Since the particular design of the operator-actuated control elements, here represented by CO and RS, is not essential for the invention proper and, as such, need not involve novelty over the master controllers, the simplified illustration in Fig. 1 has been chosen for the sake of convenience and clarity.

The armature 20 of the main generator MG and the armature 30 of the control generator CG are mounted on a common shaft 3 which, when in operation, is driven by a constant speed motor M1. Satisfactory operation can also be obtained if armature 30 is driven at constant speed while armature 20 is actuated by separate drive means whose speed does not vary excessively.

Field winding 33 of the control generator CG is energized by a regulator circuit A3 which is connected to the armature 40 of a regulating generator RG through an adjusting rheostat R6 for varying the resistance of the regulator armature circuit A3. The calibration of rheostat R3 need not be changed during the operation of the control system.

Armature 40 of regulating generator RG is mounted on a common shaft 5 with armature 50 of the above-mentioned exciter EX. Shaft 5 is connected to a constant speed motor M2. It will be understood, however, that the illustrated arrangement can be modified by using a single constant speed motor for the operation of both shafts 3 and 5, or by connecting the two shafts 3 and 5 with each other so as to obtain a single motor driven generator unit.

The regulating generator RG has three field windings 41, 44, and 45. Field winding 41 corresponds to the pattern field winding 31 of the control generator CG and is connected in series with this winding so as to be energized by the pattern voltage adjusted at the controller CO. Field winding 44 of regulating generator RG is similar in function to the voltage or speed responsive field winding 34 of control generator CG and is connected in series therewith across armature 20 of main generator MG, a calibrating resistor R4 being inserted in series with winding 44. Field winding 45, hereinafter called the "regulating field winding," is excited in accordance with the current in the feed circuit A1 and to this end connected through a calibrating rheostat R5 and leads 23 and 25 across a voltage measuring impedance in circuit A1, for instance the interpole and compensating winding 22 of generator MG in parallel to the IR-drop compensating field winding 35 of generator CG. When in operation, both windings 35 and 45 are traversed by a current whose magnitude varies in accordance with the voltage drop across the interpole field winding 22.

In order to achieve the control functions in accordance with the above-stated objects of my invention, a particular design of the two auxiliary generators CG and RG and their appertaining field exciting means is necessary, as will be set forth presently.

The control generator CG is a small electric generator, similar in design to conventional exciters. Like exciters, it possesses the ability to accurately amplify small amounts of energy supplied to its field into larger amounts for the control of large electrical machines. However, the control generator possesses this ability to a much higher degree and represents a sensitive amplifier, capable of working on very small inputs to its fields to produce a very large output in the armature circuit. This sensitivity is due to the action of the self-excited field winding 32 which feeds a small portion of the control generator output power back into the control generator as excitation to produce still more output. The field of winding 32 is just sufficient to sustain the generated voltage but, by itself, is incapable of building up the output of the machine. Hence the action of the control generator is always under the control of one or more of the separately excited field windings 31, 33, 34 and 35.

With this adjustment of the self-excited field, the ampere turns from the other field exciting means (windings 31, 33, 34, 35) can be balanced to the null point. This null condition exists when a field excitation which measures the motor speed is balanced by the field excitation of the pattern field winding caused by the standard or pattern voltage as adjusted, at will, by the operator by selecting the position of the master controller.

The motor speed corresponds to the fundamental equation:

Speed = constant $x$ (armature voltage — armature IR drop)

As stated previously, the voltage responsive field winding 34 of generator CG measures the armature voltage, and the winding 35 measures the interpole IR drop which is proportional to the motor armature IR drop since winding 22 carries the same current as the motor armature. The relative polarities of field windings 34 and 35 are such that their ampere turns are subtractive differential relative to each other and thus satisfy the above equation. The resultant speed measuring ampere turns of windings 35 and 34, as a whole, are balanced against the pattern field of winding 31.

When the motor is running at the speed called for by any selected setting of the master controller, the speed measuring ampere turns exactly cancel the ampere turns of the pattern field. Assuming the current limiting field winding 33 to be deenergized at this moment, the only effective excitation on the control generator comes now from the field of the self-energized winding 32 and there is no tendency to change the generator excitation. Should the motor speed vary from the proper value, the balance between the pattern and speed measuring excitations is disturbed, the resulting excess ampere turns then act to correct the error in motor speed. In this manner, the control generator CG provides a sensitive and accurate speed regulation. However, it has also a current or torque limiting effect due to its interconnection with the regulating generator RG.

It will be seen from the foregoing description that the control fields on the control generator, that is the pattern, voltage and IR-drop fields, have their counterpart on the regulating generator and that the corresponding field windings of the two auxiliary generators are connected in series, with the exception of the current and IR-drop field windings 35 and 45 which are paralleled to provide for independent adjustment. The proportions and relative polarities of the control fields and the current limiting field of the control generator CG are such that the current limit field will cancel the effect of any of the control fields under given operating conditions to be explained later. In other words, suppose there is a current of one ampere in the pattern field winding 31 on the control generator. This current also flows in the pattern field winding 41 of the regulating generator and generates the proper voltage to make the ampere turns of the current limit winding 33 oppose the ampere turns of the pattern field winding 31, when this is necessary to limit the load current of motor HM.

In order to apply such a current limiting control, some means must be employed to produce this canceling action only at times when the load current would otherwise exceed a safe maximum value. To accomplish this, the regulating generator RG is given the special characteristic typified by the curve in Fig. 2. This characteristic differs from that of conventional machines by having an extended low-voltage or zero-voltage interval between points F and G which are both displaced from the zero point O by fixed amounts of excitation.

A characteristic of this type can be obtained by providing the field poles of the generator with a saturable magnetic shunt as exemplified by Fig. 4.

In Fig. 4, numerals 5, 40 and 80 denote the shaft, armature and stator respectively of the regulating generator. The pole structure comprises a base portion 81 in good magnetic contact with the stator and a pole shoe portion 82 adjacent to the armature. The main pole portion 83 is shunted by a saturable flux path 85 and contains an air gap or magnetically reluctant shim 84, for instance of brass. The windings 41, 44 and 45 of the generator are arranged on the main pole portion 83. The air gap or shim at the top of the main pole portion carries both the armature-exciting flux and the shunt flux and hence does not influence the division of flux. It primarily determines the spacing F—E of the zero voltage interval as well as the slope of the characteristic beyond points F and E according to the diagram of Fig. 2. Because of this gap or shim, substantially all flux flows through the shunt, since the reluctance of this path is low and almost none of it is forced across the air gap into the armature to generate voltage, as long as the resultant field excitation is insufficient to saturate the shunt path. The shunt 85 is so proportioned that it saturates at an excitation corresponding to points F and E of Fig. 2 and then becomes unable to carry more flux. Consequently, after the saturation of the shunt, an increasing field excitation forces flux across the air gap into the armature so that now a voltage is generated. The action, after the shunt has been saturated, is similar to a conventional machine.

Due to the fact that ampere turns from the regulating field winding 45 are used for saturating the magnetic shunt, the generator output voltage is controlled in response to the armature current (and hence torque) of the hoist motor HM. As a result, the above-mentioned canceling action between the control fields and the current limiting field of the control generator CG is not effective before the magnetic shunt on the regulating generator RG is saturated, and thus occurs only when the load current of the hoist motor has exceeded a certain limit value. The control fields of the regulating generator do not saturate the shunt when performing their normal function since they are balanced against each other so that their net ampere turns are normally zero. In other words, the small transient departures from zero, necessary to obtain the desired regulating function of field windings 41 and 44, is insufficient to cause appreciable saturation in the shunt although these windings are effective in preventing hunting and other disturbances.

The arrows in Fig. 2 show the relative directions and magnitudes of the ampere turns from the fields of the regulating generator under condition obtaining when the operator tries to accelerate the hoist too rapidly, it being assumed that the master controller is in the full on position and the pattern field of winding 31 at its maximum strength corresponding to full-speed operation of the hoist motor. At the instantaneous state of operation denoted on curve V by point K, the ordinate value O—L represents the magnitude of the armature volts of the regulating generator RG required to send the proper current through the current limit field winding 33 of the control generator CG. The value O—G along the abscissa, i. e. the arrow marked I, represents the net ampere turns needed in the regulating generator to generate the voltage O—G. Value O—E, or arrow II, represents the portion of the ampere turns of the regulating field winding 44 used for saturating the magnetic shunt (85 in Fig. 4). The value represented by arrow III corresponds to the ampere turns of the pattern field winding 41, while arrow IV denotes the portion of ampere turns from the regulating field 44 used in canceling the excitation which the control generator receives from its IR-drop field winding 34, the sum of the two values denoted by arrows III and IV having the magnitude E—H. Value H—G, or arrow V, represents the ampere turns from the voltage field winding 45. The direction of the arrows I through V corresponds to relative direction of the magnetomotive force from the respective field excitation. At the instant thus exemplified, the motor has accelerated to about 30% speed, and the voltage field of winding 45 is consequently built up to approximately 30% strength. As the motor approaches full speed, and the voltage of the main generator MG also approaches maximum, the corrective effect required by the current limit winding 33 of generator CG will be less because the field resultant speed-measuring of the control generator will then cancel a greater portion of pattern field ampere turns which are tending to cause excessive load voltage and current. The voltage field (winding 44) on the regulating generator will also cancel pattern field ampere turns (winding 41), and this occurs in the same proportion as in the control generator so that the corrective effect of the current limit field winding 33 is reduced in the right amount to maintain the same motor armature current. It is this simultaneous occurrence, and its corrective effect, of the regulating action of the speed-dependent and operator-adjusted voltages that decreases an otherwise likely tendency of hunting and thus improves the accuracy, reliability and permissible speed of control The control is completely reversible and, when reversed, will limit regeneration in the same manner as described above with respect to current limitation.

The performance of a system designed in accordance with the invention has been found to satisfy all expectations. Fig. 3, for instance, shows a theoretical speed torque characteristic U of a motor controlled by such a system. Curve T represents a dynamic curve of a tested machine as taken with an oscillograph. It was found that any transient overshooting of the current limit remained in the order of 10% or less even on the severe test of plugging.

The advantages of this system of control include:

1. Better performance due to a closer approach to the ideal speed torque characteristic;
2. Less maintenance, due to the elimination of contactors and excessive commutating currents in the motors and generators;
3. Increased life of the mechanical hoist parts, due to less abuse from high torque (or current) peaks;
4. Great reliability, since the control system is based on proven designs of D.-C. equipment and is substantially free from mechanically sensitive measuring or control gauges apt to introduce sources of failure.

It will be obvious to those skilled in the art that systems according to my invention can be modified in various respects without departure from its essential features as explained above and set forth in the claims appended hereto.

I claim as my invention:

1. A variable voltage drive comprising a drive motor, a main generator having an armature circuit connected to said motor and a main field winding for controlling the voltage of said circuit, a control generator having a self-excited voltage-sustaining field winding and a current limiting field winding and further field winding means, operator-controlled circuit means for providing an adjustable pattern voltage and circuit means for providing a control voltage variable in accordance with the speed of said motor, said different circuit means being both connected with said field winding means so as to cause them to produce in said control generator a field excitation in accordance with the differential value of said pattern and control voltages, a regulating generator having saturably shunted field poles for generating abruptly increasing regulating voltage in dependence upon the passing of its field excitation through a given finite value and being connected with said current limiting field winding so as to impress said regulating voltage thereon for reducing the resultant field excitation of said control generator accordingly, circuit means for energizing said regulating generator in dependence upon the load current of said motor, and further circuit means for energizing said regulating generator also in accordance with said differential of said pattern and control voltages.

2. A variable voltage drive comprising a drive motor, a main generator having an armature circuit connected to said motor and a main generator field winding for controlling the voltage of said circuit, a control generator having a self-excited voltage-sustaining field winding and a current limiting field winding, a regulating generator having saturably shunted field poles for generating abruptly increasing regulating voltage in dependence upon the passing of its field excitation through a shunt-saturating value and being connected with said current limiting field winding, a regulating field winding forming part of said regulating generator and being connected with said circuit so as to be energized in accordance with the load current of said motor, said control generator and said regulating generator having each a pattern field winding and a control field winding operative in opposition to each other, operator controlled circuit means connected with said pattern field windings for providing them with adjustable pattern voltage, and circuit means connected with said control field windings for providing them with control voltage variable substantially in accordance with the speed of said motor, said current limiting field winding being operative in opposition to said pattern field winding of said control generator so that said increased regulating voltage causes said current limiting field winding to reduce the resultant field excitation of said control generator.

3. A variable voltage control system, comprising a main generator having an armature for impressing output voltage on a load circuit and being provided with a main field winding for controlling said voltage, a control generator having a self-excited voltage-sustaining field winding and a current limiting field winding and further field winding means, operator-controlled circuit means for providing an adjustable pattern voltage and circuit means for providing a control voltage variable in accordance with said output voltage, said different circuit means being both connected with said field winding means so as to cause them to produce in said control generator a field excitation in accordance with the differential value of said pattern and control voltages, a regulating generator having saturably shunted field poles for generating abruptly increasing regulating voltage in dependence upon the passing of its field excitation through a given finite value and being connected with said current limiting field winding so as to impress said regulating voltage thereon for reducing the resultant field excitation of said control generator accordingly, circuit means for energizing said regulating generator in dependence upon the load current of said main generator, and further circuit means for energizing said regulating generator also in accordance with said differential of said pattern anad control voltages.

4. A variable voltage control system, comprising a main generator having an armature for impressing output voltage on a load circuit and being provided with a main field winding for controlling said voltage, a control generator having a self-excited voltage-sustaining field winding and a current limiting field winding, a regulating generator having saturably shunted field poles for generating abruptly increasing regulating voltage in dependence upon the passing of its field excitation through a shunt-saturating value and being connected with said current limiting field winding, a regulating field winding forming part of said regulating generator and being connected with said circuit so as to be energized in accordance with the load current of said motor, said control generator and said regulating generator having each a pattern field winding and a control field winding operative in opposition to each other, operator controlled circuit means connected with said pattern field windings for providing them with adjustable pattern voltage, and circuit means connected with said control field windings for providing them with control voltage variable substantially in accordance with said output voltage, said current limiting field winding being operative in opposition to said pattern field winding of said control generator so that said increased regulating voltage causes said current limiting field winding to reduce the resultant field excitation of said control generator.

5. A variable voltage drive comprising a drive motor, a main generator having an armature circuit connected to said motor and a main field winding for controlling the voltage of said circuit, a control generator having a self-excited voltage-sustaining field winding and separately excited field winding means, a regulating generator having saturably shunted field poles for generating abruptly increasing regulating voltage in dependence upon the passing of its field excitation through a shunt-saturating value and being provided with field winding means and having a regulating field winding for providing component excitation in accordance with the load current of said motor, operator-controlled circuit means for providing an adjustable pattern voltage and circuit means for providing a control voltage variable in accordance with the speed of said motor, said different circuit means being both connected with said field winding means of said control generator and said regulating generator so as to energize each of them in accordance with the differential effect of said pattern and control voltages, and said field winding means of said control generator being also connected with said regulating generator so that the resultant field excitation of said control generaor is reduced due to said regulating voltage when said load current exceeds a given value.

6. A variable voltage system comprising a main generator having an armature circuit for producing an output voltage and main field means for controlling said voltage, a control generator having an armature circuit connected to said main field means for providing them with excitation and control field means for controlling said excitation, a regulating generator having an armature connected to said control field means for imposing supplying regulating voltage thereon and regulating field means of saturation-type characteristic for varying the rate of change of said regulating voltage when the excitation of said regulating field means passes through a given finite value, means for exciting said regulating field means in accordance with the load current of said circuit, operator-controlled means for providing an adjustable pattern voltage, means for providing a control voltage varying in dependence upon said output voltage, and circuit means connected with said control field means and said regulating field means for providing them with excitation in accordance with the differential of said pattern and control voltages.

7. A variable voltage system comprising a main generator having an armature circuit for producing an output voltage and main field means for controlling said voltage, a control generator having an armature circuit connected to said main field means for providing them with excitation and control field means for controlling said excitation, said control field means including pattern field and voltage field windings arranged to balance the respective ampere turns under normal steady operating conditions, a regulating generator having an armature connected to said control field means for imposing supplying regulating voltage thereon and regulating field means of saturation-type characteristic for varying the rate of change of said regulating voltage when the excitation of said regulating field means passes through a given finite value, said regulating field means including also pattern field and voltage field windings arranged to balance their respective ampere turns under normal steady operating conditions, means for exciting said regulating field means in accordance with the load current of said circuit, operator-controlled means for imposing an adjustable pattern voltage on said pattern field windings of said control generator and said regulating generator, and means for imposing a variable voltage on said voltage field windings of said control generator and said regulating generator.

8. A hoist control system comprising a direct-current hoist motor, a main generator having an armature circuit connected to said motor and main field means for controlling the voltage of said circuit, a control generator connected to said main field means for exciting the latter and having a normally substantially deenergized current limit field winding, a pattern field winding and a voltage field winding arranged to balance the respective fields under normal steady operating conditions, a regulating generator connected to said current limit field windings and having saturation characteristic so as to energize said latter winding substantially only when excited beyond a given minimum excitation, said regulating generator having a regulator field winding connected with said circuit to be excited in dependence upon the load current of said motor and being provided with a pattern field winding and a voltage field winding arranged to balance their respective fields under normal steady operating conditions, an operator-controlled voltage source for imposing an adjustable pattern voltage on said pattern field windings of said control generator and said regulating generator, and another voltage source for imposing a variable voltage on said voltage field windings of said control generator and said regulating generator.

9. A hoist control system comprising a direct-current hoist motor, a main generator having an armature circuit connected to said motor and main field means for controlling the voltage of said circuit, a control generator connected to said main field means for exciting the latter and having a normally substantially deenergized current limit field winding, a pattern field winding and a voltage field winding arranged to balance the respective fields under normal steady operating conditions, and having also a self-excited field winding connected between said control generator and said main field means to produce a feed-back amplifying effect in said control generator, a regulating generator connected to said current limit field winding and having saturation characteristic so as to energize said latter winding substantially only when excited beyond a given minimum excitation, said regulating generator having a regulator field winding connected with said circuit to be excited in dependence upon the load current of said motor and being provided with a pattern field winding and a voltage field winding arranged to balance their respective fields under normal steady operating conditions, an operator-controlled voltage source for imposing an adjustable pattern voltage on said pattern field windings of said control generator and said regulating generator, and another voltage source for imposing a variable voltage on said voltage field windings of said control generator and said regulating generator.

10. A hoist control system comprising a direct-current hoist motor, a main generator having an armature circuit connected to said motor and main field means for controlling the voltage of said circuit, a control generator connected to said main field means for exciting the latter and having a normally substantially deenergized current limit field winding, a pattern field winding and further field winding means capable of balancing the field of said pattern field winding under normal steady-state operating conditions, a regulating generator connected to said current limit field winding and having saturation characteristic so as to energize said latter winding substantially only when excited beyond a given minimum excitation, said regulating generator having a regulator field winding connected with said circuit to be excited in dependence upon the load current of said motor and being provided with a pattern field winding and further field winding means capable of balancing the field of said latter pattern field winding under normal steady-state operating conditions, an operator-controlled voltage source for imposing an adjustable pattern voltage on said pattern field windings of said control generator and said regulating generator, and means for imposing variable excitation on said further field winding means of said control generator and said regulating generator in dependence upon speed variations of said motor.

11. A variable voltage drive comprising a drive motor, a main generator having an armature circuit connected to said motor and a main field winding for controlling the voltage of said circuit, a control generator having a self-excited voltage-sustaining field winding and further field winding means, operator-controlled circuit means for providing an adjustable pattern voltage and circuit means for providing a control voltage variable in accordance with the speed of said motor, said different circuit means being both connected with said field winding means so as to cause them to produce in said control generator a field excitation in accordance with the differential value of said pattern and control voltages, a regulating generator having saturably shunted field poles for generating abruptly increasing regulating voltage in dependence upon the passing of its field excitation through a given value, circuit means for energizing said regulating generator in dependence upon the load current of said motor, and further circuit means for energizing said regulating generator also in accordance with said differential of said pattern and control voltages, said control generator and said regulating generator being interconnected for controlling the excitation of said main field winding.

WILLIAM R. HARDING.